Figure 1:
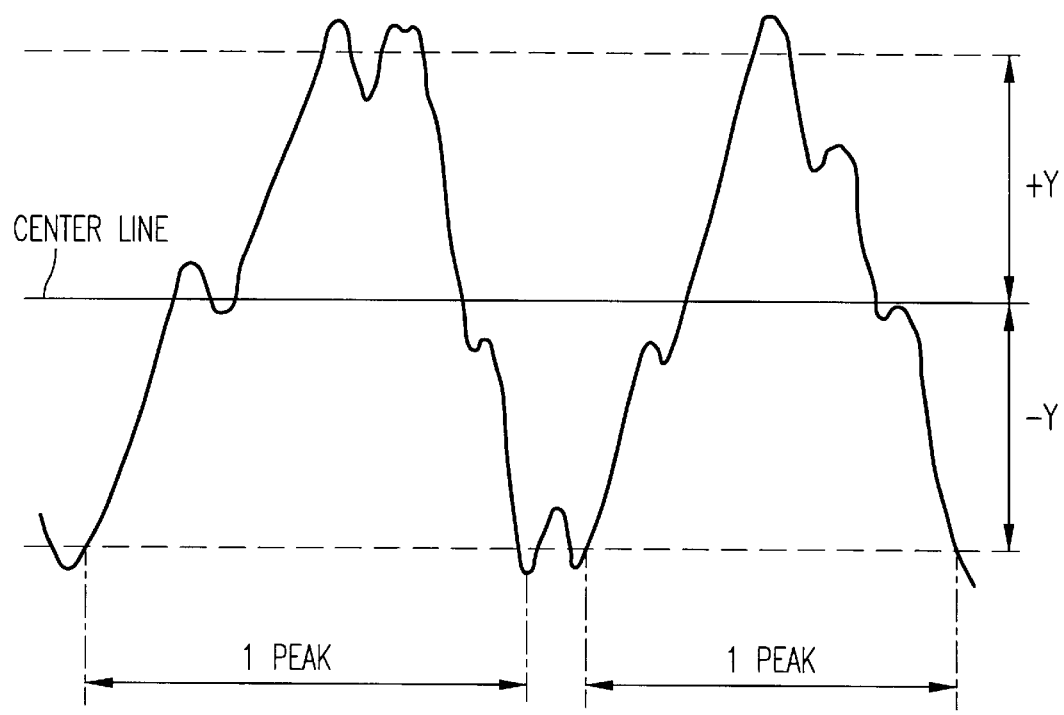

United States Patent [19]
Suzuki et al.

[11] Patent Number: 6,042,928
[45] Date of Patent: Mar. 28, 2000

[54] FLUOROCARBON RESIN SHEET AND GLASS LAMINATE

[75] Inventors: Takanobu Suzuki; Kenji Nakamura; Eichi Watanabe, all of Nagahama, Japan

[73] Assignee: Mitsubishi Plastics Inc., Tokyo, Japan

[21] Appl. No.: 08/921,017

[22] Filed: Aug. 29, 1997

[30] Foreign Application Priority Data

| Sep. 2, 1996 | [JP] | Japan | 8-232200 |
| Sep. 9, 1996 | [JP] | Japan | 8-237581 |
| Oct. 4, 1996 | [JP] | Japan | 8-264172 |
| Jan. 17, 1997 | [JP] | Japan | 9-005919 |
| Jul. 11, 1997 | [JP] | Japan | 9-186372 |

[51] Int. Cl.$^7$ .............. B32B 3/10; B32B 27/00; B32B 17/10
[52] U.S. Cl. .............. 428/141; 428/142; 428/421; 428/422; 428/920; 428/921
[58] Field of Search .................. 428/421, 422, 428/141, 142, 441, 442, 920, 921

[56] References Cited

U.S. PATENT DOCUMENTS

| 3,373,076 | 3/1968 | Gosnell | 428/422 |
| 4,452,840 | 6/1984 | Sato et al. | 428/156 |
| 5,230,954 | 7/1993 | Sakamoto et al. | 428/332 |
| 5,593,786 | 1/1997 | Parker et al. | 428/426 |
| 5,662,977 | 9/1997 | Spain et al. | 428/42.1 |
| 5,705,254 | 1/1998 | Morinaga et al. | 428/141 |
| 5,792,560 | 8/1998 | Friedman et al. | 428/441 |

FOREIGN PATENT DOCUMENTS

| 0 494 538 | 7/1992 | European Pat. Off. . |
| 0 525 403 | 2/1993 | European Pat. Off. . |
| 0 711 654 | 5/1996 | European Pat. Off. . |

*Primary Examiner*—Paul Thibodeau
*Assistant Examiner*—Ramsey Zacharia
*Attorney, Agent, or Firm*—Oblon, Spivak, McClelland, Maier & Neustadt, P.C.

[57] ABSTRACT

A fluorocarbon resin sheet having a fluorine content of at least 55% and a melting point of from 60 to 220° C., made solely of a polymer comprising at least one fluorine-containing monomer, or made of a blend of such a polymer with other polymer, which has a total light transmittance of at least 80% and a tensile modulus of elasticity within a range of from $1 \times 10^7$ to $4 \times 10^9$ Pa within an entire measuring temperature range of from 0 to 30° C., wherein the surface of the resin sheet is embossed to have a center line average roughness Ra of from 0.05 to 2.0 µm and a number of peaks Pc of from 5 to 500 peaks/8 mm.

20 Claims, 1 Drawing Sheet

FLUOROCARBON RESIN SHEET AND GLASS LAMINATE

The present invention relates to a fluorocarbon resin sheet and a glass laminate employing it. More particularly, it relates to a fluorocarbon resin sheet which is excellent in transparency and flame retardancy and which at the same time is excellent in processability for lamination with a glass plate, and a glass laminate.

A glass plate is a material having transparency and strength, but is poor in impact resistance. To complement such poor impact resistance, it is common to employ a glass laminate having a plastic sheet laminated on such a glass plate. A usual plastic sheet is effective for preventing scattering of glass fragments upon breakage of the glass plate, but at the time of a fire, the plastic sheet is likely to burn, whereby flame retardancy can not be satisfied. Therefore, a glass laminate having a fluorocarbon resin sheet laminated on a glass plate, has been proposed as a glass product which has fire-proofing and flame-proofing properties and which also has a property for preventing scattering of glass fragments even when broken.

However, a conventional glass laminate employing a fluorocarbon resin sheet had problems such that no adequate consideration was made with respect to optimum properties required for such a sheet for its lamination, and bubbles were likely to be included during the production of a glass laminate, whereby the desired functions of a laminated glass from the viewpoint of its appearance and physical properties, can hardly be obtained.

The present invention is based on a discovery of a fluorocarbon resin sheet and a glass laminate which can solve such problems.

With respect to the fluorocarbon resin sheet, the present invention provides:

(1) a fluorocarbon resin sheet having a fluorine content of at least 55% and a melting point of from 60 to 220° C., made solely of a polymer comprising at least one fluorine-containing monomer, or made of a blend of such a polymer with other polymer, which has a total light transmittance of at least 80% and a tensile modulus of elasticity within a range of from $1\times10^7$ to $4\times10^9$ Pa within an entire measuring temperature range of from 0 to 30° C., or such a fluorocarbon resin sheet provided with an adhesive layer formed on one side or each side of the fluorocarbon resin sheet, wherein the surface of the resin sheet, or the surface of the adhesive layer, is embossed to have a center line average roughness Ra of from 0.05 to 2.0 μm and a number of peaks Pc of from 5 to 500 peaks/8 mm; and (2) a fluorocarbon resin sheet provided with an adhesive layer, which comprises a fluorocarbon resin sheet having a fluorine content of at least 55% and a melting point of from 60 to 220° C., made solely of a polymer comprising at least one fluorine-containing monomer, or made of a blend of such a polymer with other polymer, which sheet has a tensile modulus of elasticity within a range of from $1\times10^7$ to $4\times10^9$ Pa within an entire measuring temperature range of from 0 to 30° C., and an adhesive layer formed on one side or each side of the fluorocarbon resin sheet, wherein the total light transmittance Tb of the fluorocarbon resin sheet is at least 90%, the thickness Da of the adhesive layer is from 0.03 to 10 μm, and the absolute value of Na–Nb, i.e. |Na–Nb|, is at most 0.13, where Na is the refractive index of the adhesive layer, and Nb is the refractive index of the fluorocarbon resin sheet.

With respect to the glass laminate, the present invention provides:

(1) a glass laminate comprising at least two glass plates and a fluorocarbon resin sheet interposed between the glass plates, said resin sheet being a fluorocarbon resin sheet having a fluorine content of at least 55% and a melting point of from 60 to 220° C., made solely of a polymer comprising at least one fluorine-containing monomer, or made of a blend of such a polymer with other polymer, which has a total light transmittance of at least 80% and a tensile modulus of elasticity within a range of from $1\times10^7$ to $4\times10^9$ Pa within an entire measuring temperature range of from 0 to 30° C., wherein the surface of the resin sheet is embossed to have a center line average roughness Ra of from 0.05 to 2.0 μm and a number of peaks Pc of from 5 to 500 peaks/8 mm; and (2) a glass laminate comprising a glass plate and a fluorocarbon resin sheet which are laminated by an adhesive layer, said resin sheet being a fluorocarbon resin sheet having a fluorine content of at least 55% and a melting point of from 60 to 220° C., made solely of a polymer comprising at least one fluorine-containing monomer, or made of a blend of such a polymer with other polymer, which sheet has a tensile modulus of elasticity within a range of from $1\times10^7$ to $4\times10^9$ Pa within an entire measuring temperature range of from 0 to 30° C., wherein the total light transmittance Tb of the fluorocarbon resin sheet is at least 90%, the thickness Da of the adhesive layer is from 0.03 to 10 μm, and the absolute value of Na–Nb, i.e. |Na–Nb|, is at most 0.13, where Na is the refractive index of the adhesive layer, and Nb is the refractive index of the fluorocarbon resin sheet.

In the accompanying drawing, FIG. 1 is a view illustrating the method of counting the number of peaks of an emboss.

Now, the present invention will be described in detail with reference to the preferred embodiments.

In the present invention, the fluorocarbon resin sheet is made solely of a polymer comprising at least one fluorine-containing monomer, or made of a blend of such a polymer with other polymer. The fluorine-containing monomer component may, for example, be vinyl fluoride, vinylidene fluoride, trifluoroethylene, tetrafluoroethylene, pentafluoropropylene or hexafluoropropylene. The resin sheet is made of a homopolymer or copolymer of such fluorine-containing monomer, or a copolymer prepared by using a vinyl monomer such as ethylene or an alkyl vinyl ether, in combination with the fluorine-containing monomer, or a blend thereof.

Such a material is useful so long as it can be formed into a sheet and can be embossed, i.e. it is hot-melt moldable. Particularly, fluorocarbon resins other than a homopolymer of tetrafluoroethylene (PTFE), can be used without any particular restriction.

Specifically, a tetrafluoroethylene/perfluoroalkylvinyl ether copolymer, a tetrafluoroethylene/hexafluoropropylene copolymer, a tetrafluoroethylene/vinylidene fluoride/hexafluoropropylene copolymer or a polyvinylidene fluoride, may, for example, be mentioned.

Here, the fluorocarbon resin sheet having such a composition, is required to have a fluorine content of at least 55% and a melting point within a range of from 60 to 220° C. If the fluorine content is less than 55%, the flame retardancy of the sheet tends to be poor, and the fire-proofing and flame-proofing properties of the glass laminate will be impaired.

Further, with one having a melting point of less than 60° C., there will be a problem that heat resistance during lamination with a glass plate tends to be inadequate, and especially in summer time, softening tends to be remarkable, whereby handling tends to be difficult, and consequently the heat resistance of a laminated glass thereby obtained tends to be low, and there will be a problem that glass plates are likely to be displaced.

With one having a melting point exceeding 220° C., no suitable material is available as a pressing medium which dose not damage a glass plate during the lamination and which also has adequate heat resistance. Accordingly, lamination has to be done at a temperature lower than 220° C., whereby the sheet will not melt and bond to the glass surface, whereby there will be a problem that both the strength and the appearance tend to be impaired. A method may be conceivable in which no pressure is exerted after heating the material to a temperature of at least 220° C. However, by such a method, a sheet can not adequately follow the waving of the glass plate surface and will not adequately bond to the glass plate except for local bonding, whereby there will be a problem that both the strength and the appearance tend to be impaired, and satisfactory lamination can hardly be attained.

Adjustment of the melting point within the above range can be made by adjusting e.g. the crystallinity or the monomer compositional ratio of the resin to be used.

Further, an additional component such as an ultraviolet absorber may suitably be added to the resin within a range not to impair the adhesiveness or transparency.

The thickness of the fluorocarbon resin sheet of the present invention is not particularly limited, but is usually preferably within a range of from 0.05 to 1 mm from the viewpoint of the impact resistance or the handing efficiency during lamination to glass plates. Also with respect to a method for forming the sheet, a commonly known method may be employed. For example, it is possible to employ a method in which the resin material is dissolved in an organic solvent and uniformly coated on a substrate having a release property, and then the organic solvent is removed by drying, followed by peeling the sheet from the substrate, a method in which the material is formed into an aqueous emulsion, which is uniformly coated on a substrate having a release property, and then water is removed by drying, followed by peeling the sheet from the substrate, or a thermoplastic molding method such as extrusion molding or calender molding.

The fluorocarbon resin sheet obtained by the above described method, is required to have a total light transmittance of at least 80% and a tensile modulus of elasticity within a specified range within a measuring temperature range of from 0 to 30° C. The method for measuring the total light transmittance is in accordance with JIS K7105. By adjusting the total light transmittance to a level of at least 80%, transparency will not be impaired when it is laminated with a glass plate. Further, it is required that the tensile modulus of elasticity is within a range of from $1 \times 10^7$ to $4 \times 10^9$ Pa within an entire measuring temperature range of from 0 to 30° C.

The range of the measuring temperature of from 0 to 30° C. corresponds to a common atmospheric temperature and also corresponds to the temperature of the atmosphere during the preparation of a glass laminate. The method for measuring the tensile modulus of elasticity is such that the dynamic visco-elasticity is measured by a tensile method at a cycle of 1 Hz, and the storage elastic modulus is thereby obtained.

If the above tensile modulus of elasticity exceeds $4 \times 10^9$ Pa, the fluorocarbon resin sheet tends to be hard, whereby compatibility (wettability) with a glass plate tends to be poor, and there will be a problem such that such a fluorocarbon resin sheet is likely to slip when it is set on a glass plate for lamination, and displacement of the glass plates is likely to occur during the process until completion of lamination, such as during transportation or during pressing. On the other hand, if the tensile modulus of elasticity is less than $1 \times 10^7$ Pa, the fluorocarbon resin sheet tends to be soft, there will be a problem that not only its handling during lamination tends to be difficult, but also its affinity to a glass plate tends to be excessive, and slippage tends to be poor, when it is set on a glass plate for lamination, whereby the sheet can not be set at a predetermined position, and bubbles are likely to be locally trapped at the interface with the glass plate, so that the appearance as a glass laminate tends to be impaired.

Like adjustment of the melting point, the tensile modulus of elasticity can be adjusted within the above range by adjusting e.g. the crystallinity or the monomer compositional ratio of the resin to be used.

Further, it is necessary to form a certain specific emboss on the surface of the above fluorocarbon resin sheet. Namely, the surface of the resin sheet is embossed to have a center line average roughness Ra within a range of from 0.05 to 2 μm and a number of peaks Pc within a range of from 5 to 500 peaks/8 mm. Here, the center line average roughness Ra is the one stipulated as an arithmetic mean roughness Ra in JIS B0601. The number of peaks Pc is determined in such a manner that as shown in FIG. 1, two parallel lines are drawn at distances of ±y mm from the center line of the roughness curve obtained as above, and a section of the curve which starts from the −y line, reaches the +y line and returns again to −y line, is counted as one peak.

If Ra is less than 0.05 μm, slippage of the sheet tends to be poor when it is set on a glass plate for lamination therewith, and it is likely to be contacted with the glass plate in such a state that the sheet is waved or sagging, whereby air between the sheet and the glass plate can not adequately be removed, and bubbles are likely to remain. On the other hand, if Ra exceeds 2 μm, peaks of the emboss tends to be too high, whereby the glass plate is likely to slip at the time of setting, and displacement of the glass plates is likely to occur during subsequent transportation or pressing, and the appearance as a glass laminate tends to be impaired.

If Pc is less than 5 peaks/8 mm, the distances between peaks of the sheet tend to be so large that even valleys are likely to contact the glass at an early stage of the heat melting, whereby bubbles tend to remain at irregular positions to present a poor appearance. On the other hand, if Pc exceeds 500, the distances between peaks tend to be too short, whereby bubbles are likely to be trapped between the peaks during a process wherein the peaks are melted under heating, to present a poor appearance.

A particularly preferred emboss is such that the center line average roughness Ra is within a range of from 0.1 to 0.5 μm, and the number of peaks Pc is within a range of from 50 to 200 peaks/8 mm. Within such ranges, the balance of slippage and displacement of glass plates is good, and remaining bubbles will remarkably be reduced.

Further, it is preferred that the difference between the maximum value and the minimum value of thickness within a range of optional 5 cm in the fluorocarbon resin sheet is at most 15 μm. If the difference exceeds 15 μm, the irregularity at such portion tends to be so large that the convex portion is likely to melt and bond to glass by heating before bubbles are sufficiently removed from the surrounding concave portions, thus leading to a poor appearance.

A method for imparting such an emboss to the resin surface is not particularly limited. For example, there may be mentioned a method wherein a fluorocarbon resin sheet is preheated, and a heated embossing roll or an embossing belt is pressed thereon, a method of pressing with an embossing plate by a hot plate method, or a method wherein a transfer sheet having an emboss is hot-pressed, and then peeled.

The glass plate to be laminated with the above fluorocarbon resin sheet is not particularly limited and may be one commonly used for industrial purpose. Glass plates for the same type or different types may be selected for use from soda lime glass, borosilicate glass, crystallized glass and wired sheet glass.

The thickness of the glass plate is suitably selected depending upon the nature of application, and it is usually within a range of from 1 to 20 mm.

Further, the surface of the glass plate is preferably finished to have little weaving so as to facilitate removal of bubbles and to minimize retention of bubbles between the glass plate and the fluorocarbon resin sheet when the glass plate is laminated with the resin sheet.

The fluorocarbon resin sheet as described above may be used in the form having an adhesive layer formed on one side or both sides thereof. Otherwise, such an adhesive layer may be formed on the glass plate side.

As a sheet provided with such an adhesive layer, preferred is one wherein the surface of the adhesive layer is embossed to have a center line average roughness Ra, as mentioned above, within a range of from 0.1 to 0.5 μm and a number of peaks Pc within a range of from 50 to 200 peaks/8 mm.

The adhesive layer may be any coating layer, so long as it is industrially used and has an adhesive property to both the glass plate and the fluorocarbon resin. For example, an adhesive of e.g. an ethylene/vinyl acetate copolymer, polyvinyl ether type, polyester type, acrylic type, epoxy type, polyurethane type, rubber type or silicone type, may be employed.

Here, as a preferred adhesive, an adhesive comprising from 40 to 80 wt %, preferably from 50 to 70 wt %, of a fluorocarbon resin component and from 20 to 60 wt %, preferably from 30 to 50 wt %, of an acrylic resin component, may be used. If the fluorocarbon resin component is less than 40 wt %, the adhesive property to the fluorocarbon resin sheet tends to be poor, and if the fluorocarbon resin component exceeds 80 wt % (the acrylic resin component being less than 20 wt %), the adhesive property to the glass plate tends to be poor.

These two components may be in the form of a block copolymer comprising blocks of fluorine-containing monomer and blocks of (meth)acrylic acid ester, or a graft copolymer having one of the resin components grafted on the other resin component. However, a blend of a fluorocarbon resin and an acrylic resin is practically preferred in view of the costs and the production efficiency of the resins.

As the fluorocarbon resin component, one consisting mainly of vinylidene fluoride as the monomer component may be used. Specifically, one comprising from 50 to 100 wt % of vinylidene fluoride, from 0 to 40 wt % of tetrafluoroethylene and from 0 to 30 wt % of hexafluoropropylene, is preferred.

On the other hand, as a monomer for the acrylic resin, an ester such as methyl, ethyl, propyl, butyl, isobutyl, n-hexyl, 2-ethylhexyl, lauryl or stearyl ester of (meth)acrylic acid may be mentioned. However, methyl methacrylate is an essential component, and is required to be contained in a proportion of at least 90 wt % in the acrylic resin components. If it is less than 90 wt %, the adhesion to the glass plate tends to be inadequate when bonded to the glass plate. Further, as other alkyl (meth)acrylate monomers, methyl acrylate, butyl acrylate, butyl methacrylate and isobutyl methacrylate may, for example, be employed.

Further, in order to improve the adhesion to the glass plate, an acid monomer such as acrylic acid, methacrylic acid, fumaric acid or itaconic acid may preferably be added.

When the adhesive is a blend of a fluorocarbon resin component and an acrylic resin component, it is important from the viewpoint of transparency and bonding strength that the compatibility of the two components is good. From this viewpoint, it is preferred to employ, as a fluorocarbon resin component, one comprising vinylidene fluoride having good compatibility with an acrylic resin, as the main monomer component.

Further, the compatibility can be adjusted by adjusting the molecular weight of the two components or incorporating the above-mentioned copolymer component to the two resin components.

In general, the number average molecular weight Mn of the fluorocarbon resin component is preferably from 40,000 to 150,000, and the number average molecular weight Mn of the acrylic resin component is preferably from 2,000 to 50,000. As such an adhesive component, one containing a vinylidene fluoride type fluorocarbon resin is preferred. Accordingly, if a fluorocarbon resin sheet containing vinylidene fluoride as a common component is used, the degree of adhesion between the sheet and the adhesive will be high, such being desirable. Further, as an adhesive, one comprising from 90 to 99 wt % of a fluorocarbon resin component and from 1 to 10 wt % of an amino type silane coupling agent, is also preferred. As the fluorocarbon resin component, the one having the above-described composition is preferably used. As the amino type silane coupling agent, ω-aminoalkylsilane is used. Specifically, γ-aminopropyltriethoxysilane, or N-(β-aminoethyl).γ-aminopropylmethyldimethoxysilane may, for example, be mentioned.

The sheet provided with the above adhesive coating layer is very useful, as it can be wound up by a usual method after drying the adhesive layer, and its storage is easy.

Coating of the adhesive layer to the fluorocarbon resin sheet can be carried out by a conventional method. To impart an emboss to the surface of the adhesive layer, a polyester film having a prescribed surface roughness may be press-bonded to the adhesive layer after its formation, so that fine irregularities of the surface will be transferred to the adhesive layer, whereby an emboss to facilitate removal of bubbles, can be formed. Otherwise, the emboss may be imparted by a method wherein the adhesive layer is heated to some extent, and then a heated embossing roll or embossing belt is pressed against it, or a method of pressing with an embossing plate by a hot press method.

The fluorocarbon resin sheet having a predetermined emboss imparted on its surface or a fluorocarbon resin sheet provided with an adhesive layer having a predetermined emboss imparted on its surface, according to the present invention, may be sandwiched between glass plates and hot-pressed and melted to bond the glass plates to each other. The obtained glass laminate has fire-proofing and flame-proofing properties and at the same time, has a property to prevent scattering of glass fragments when broken. Further, inclusion of bubbles is little, whereby the appearance is good, and the bonding strength is excellent. Further, the fluorocarbon resin sheet of the present invention can, of course, be applied also to a field where fire-proofing and flame-proofing properties are not required, by utilizing the feature that inclusion of bubbles is little. However, in such a case, it may be a sheet wherein both surface layers are made of a fluorocarbon resin, and the center is a layer of other polymer such as polyethylene terephthalate.

Here, the fluorocarbon resin sheet provided with the adhesive layer is preferably such that in order to improve the transparency, the optical relation between the fluorocarbon resin sheet and the adhesive layer is adjusted as follows. Namely, it is a fluorocarbon resin sheet, wherein the total light transmittance Tb of the fluorocarbon resin sheet is at least 90%, the thickness Da of the adhesive layer is from 0.03 to 10 μm, and the absolute value of Na–Nb, i.e. |Na–Nb|, is at most 0.13, where Na is the refractive index of the adhesive layer, and Nb is the refractive index of the fluorocarbon resin sheet.

In this fluorocarbon resin sheet provided with the adhesive layer, Da is preferably at least 0.01 μm, and preferably Da×|Na–Nb|≦0.1. More preferably, Da is within a range of from 0.05 to 0.5 μm, and Da×|Na–Nb|≦0.03.

Here, if the thickness Da of the adhesive coating laye is less than 0.03 μm, no adequate bonding strength will be obtained between the glass plate and the fluorocarbon resin sheet, and if it exceeds 10 μm, the transparency tends to be impaired when laminated with glass plates.

Further, with respect to the relation between the fluorocarbon resin sheet and the adhesive layer, the absolute value of Na–Nb, i.e. |Na–Nb|, is required to be at most 0.13. If |Na–Nb| exceeds 0.13, fogging tends to increase due to the difference in refractive indices when bonded to glass plates. Preferably, Da is at least 0.01 μm, and the product of Da and |Na–Nb|, i.e. Da×|Na–Nb|, is at most 0.1.

Within these ranges, the bonding strength between the glass plates and the fluorocarbon resin sheet is secured, and the transparency of the laminate can be maintained. If Da×|Na–Nb| exceeds 0.1, the transparency of the laminate tends to gradually decrease. Particularly preferably,Da is within a range of from 0.05 to 0.5 μm, and Da×|Na–Nb|≦0.03.

Now, the present invention will be described in further detail with reference to Examples. However, it should be understood that the present invention is by no means restricted to such specific Examples.

No. 1 to No. 7
No. 1

A fluorocarbon resin comprising 30 wt % of vinylidene fluoride, 50 wt % of tetrafluoroethylene and 20 wt % of hexafluoropropylene, was extrusion-molded by an extruder into a sheet having a thickness of 200 μm, which was then heated and pressed by an embossing roll to obtain a fluorocarbon resin sheet having an emboss imparted to each side. The obtained fluorocarbon resin sheet was sandwiched between a pair of glass plates (thickness: 3 mm, width: 900 mm, length: 2,000 mm) having an adhesive coated on their surfaces, to obtain a glass laminate. The adhesive was made of a mixture comprising a fluorocarbon resin containing vinylidene fluoride as the main component and an acrylic resin containing methyl methacrylate as the main component, wherein the mixing ratio (weight ratio) was the fluorocarbon resin/the acrylic resin=55/45 (Nobafusso PF-250 C-2, tradename, manufactured by Dai Nippon Shikizai Kogyo K.K.), and this adhesive was directly coated and dried to form the adhesive layer having a thickness of 0.4 μm.

With respect to the fluorocarbon resin sheet and the glass laminate, physical properties of the following items were measured, and the lamination property for a glass laminate (including the setting property of the sheet with the glass plates at the time of lamination and the appearance after assembled into a glass laminate) was evaluated as an overall evaluation. The results are shown in Table 1. With respect to the setting property, symbol ○ indicates that the sheet can easily be positioned on the glass plate, and after setting, the glass plates will not undergo slippage or displacement. With respect to the appearance, ○ indicates that no bubbles or displacement of the glass plates are observed.

The test and evaluation methods of the respective items are as follows.

(1) With respect to light transmittance of a sheet, the total light transmittance (%) was measured in accordance with JIS K7105.

(2) With respect to the fluorine content in a sheet, the proportion (wt %) of the total weight of fluorine atoms to the total weight of the fluorocarbon resin-constituting atoms, was calculated from the monomer composition of the fluorocarbon resin.

(3) With respect to the melting point of a sheet, a differential scanning calorimetry was carried out at a temperature raising rate of 10° C./min, whereby the heat absorption peak temperature was obtained.

(4) With respect to the center line average roughness Ra and the number of peaks Pc, using a stylus surface roughness meter (SE-3FK, manufactured by Kabushiki Kaisha Kosaka Kenkyusho), the center line average roughness was measured with respect to an optional 8 mm distance in the resin surface under measuring conditions such that the stylus forward end diameter was 2 μm, the stylus load was 70 mg and the cut off value was 0.8 mm.

For the number of peaks Pc, as shown in FIG. 1, two parallel lines were drawn at distances of ±y mm from the center line of the roughness curve obtained as described above, and a section of the curve which starts from a –y line, reaches a +y line and again returns to a –y line, was counted as one peak.

Here, y mm is 0.25/measuring magnification, and the measuring magnification was 5,000, but with respect to No. 7 where the peak was high, the measuring magnification was 500.

No. 2 and No. 3

A polyvinylidene fluoride was molded into a sheet having a thickness of 200 μm by the same extruder as in No. 1, followed by embossing. This sheet was sandwiched between a pair of glass plates (thickness: 3 mm, width: 900 mm, length: 2,000 mm) at 200° C. in the same manner as in No. 1, to obtain a glass laminate. The evaluations were carried out in the same manner as in No. 1.

No. 4

An ethylene/tetrafluoroethylene copolymer was molded into a sheet having a thickness of 200 μm by the same extruder as in No. 1, followed by embossing. This sheet was sandwiched between a pair of the same glass plates as used in No. 1 at 220° C., followed by heating and pressing, whereby the sheet did not bond to the glass plates at all. Therefore, the heating temperature was raised, and only by heating at 300° C., a glass laminate was prepared.

No. 5

A vinylidene fluoride/hexafluoropropylene copolymer was formed into a sheet having a thickness of 300 μm by means of a calender roll, followed by embossing. This sheet was used to prepare a glass laminate in the same manner as in No. 1 at 120° C., whereby slippage during setting of the sheet was poor, and many bubbles remained after lamination.

No. 6

A polyvinylidene fluoride was molded into a sheet having a thickness of 200 μm by an extruder, followed by embossing. This sheet was used to prepare a glass laminate in the same manner as in No. 1 at 200° C., whereby slippage tended to be too much in setting of the glass plates and the sheet, and there was a problem that positions of the pair of glass plates tended to be displacement during lamination.

No. 7

A copolymer fluorocarbon resin comprising 30 wt % of vinylidene fluoride, 50 wt % of tetrafluoroethylene and 20 wt % of hexafluoropropylene, was molded into a sheet having a thickness of 200 μm by an extruder, followed by embossing. This sheet was used for preparation of a glass laminate in the same manner as in No. 1 at 190° C., whereby slippage was poor in setting of the sheet and the glass plates, and setting was not properly done, and bubbles entered at that time, remained after lamination.

pair of glass plates, followed by heating to obtain a glass laminate. The appearance, etc. of the obtained glass laminate were evaluated, and the results are shown in Table 2.

The tests and evaluation methods other than the above-described items are as follows.

Difference Between the Maximum Value and the Minimum Value of the Thickness

Using a contact type continuous thickness meter, the thickness of the sheet was measured by a unit of 1 μm. The measured portions were two locations along the longitudinal direction of the sheet and two locations along the width direction of the sheet, and the measurement was made over a length of 50 cm at each location. In each measured length of 50 cm, a portion of 5 cm where the difference between the maximum value and the minimum value of the thickness was largest, was determined, and the difference between the maximum value and the minimum value was obtained. The

TABLE 1

|  | 1 | 2 | 3 | 4 | 5 | 6 | 7 |
|---|---|---|---|---|---|---|---|
| Light transmittance (%) | 93 | 84 | 84 | 82 | 89 | 84 | 93 |
| Fluorine content (%) | 72 | 59 | 59 | 59 | 62 | 59 | 72 |
| Melting point (° C.) | 160 | 175 | 175 | 263 | Fluidized at room temp. | 175 | 160 |
| Elastic modulus (Pa) | | | | | | | |
| Measuring temp = 0° C. | $6 \times 10^8$ | $3 \times 10^9$ | $3 \times 10^9$ | $1 \times 10^9$ | $8 \times 10^6$ | $3 \times 10^9$ | $6 \times 10^5$ |
| Measuring temp = 30° C. | $1 \times 10^8$ | $2 \times 10^9$ | $2 \times 10^9$ | $9 \times 10^8$ | $6 \times 10^6$ | $2 \times 10^9$ | $6 \times 10^8$ |
| Emboss | | | | | | | |
| Ra (μm) | 0.33 | 0.13 | 0.45 | 0.12 | 0.44 | 0.69 | 2.9 |
| Pc (μm) | 99 | 68 | 179 | 110 | 97 | 560 | 4 |
| Setting property | ○ | ○ | ○ | ○ | Poor slippage | Too much slippage | Poor slippage |
| Appearance | ○ | ○ | ○ | Bubbles remained | Bubbles remained | Displacement of glass plates | Bubbles remained |
| Lamination property | ○ | ○ | ○ | X | X | X | X |

From Table 1, it is evident that No. 1 to No. 3 representing the fluorocarbon resin sheet of the present invention and the glass laminate employing this sheet, are excellent in the lamination property for a glass laminate (the setting property during lamination and the appearance after assembled into a glass laminate). On the other hand, No. 4 wherein the melting point of the sheet was too high, was poor in the lamination property and particularly had a problem that bubbles remained in the glass laminate. Inversely, No. 5 wherein the melting point and the tensile elastic modulus of the sheet were too low, was poor in slippage and thus inferior in the setting property. Further, No. 6 and No. 7 wherein the emboss shape was outside the range of the present invention, were poor in each of the setting property and the appearance of the lamination property.

No. 8 to No. 14

The same fluorocarbon resin as used in No. 1 was melt-extruded, and then on the surface of each side of the molded sheet, the same adhesive as used in No. 1 was coated in a thickness of 1 μm. Before the adhesive was dried up, a polyester film having a variously embossed surface was pressed against the surface of the adhesive layer on each side to obtain a fluorocarbon resin sheet provided with an adhesive layer having a variously embossed surface on each side.

The fluorocarbon resin sheet provided with such an adhesive coating layer thus obtained, was sandwiched between a four values of the difference between the maximum value and the minimum value at the four measured locations were averaged.

Appearance

The appearance of the glass laminate was visually inspected, and the number of remaining bubbles was evaluated by the following three levels.

○: No substantial bubbles remained.

Δ: Small bubbles partially remained.

X: Bubbles remained over the entire surface.

TABLE 2

| No. | Ra (μm) | Pc (peaks/8 mm) | Difference in thickness (μm) | Appearance |
|---|---|---|---|---|
| 8 | 0.07 | 182 | 9 | Δ |
| 9 | 0.10 | 102 | 5 | ○ |
| 10 | 0.27 | 124 | 13 | ○ |
| 11 | 0.28 | 170 | 8 | ○ |
| 12 | 1.2 | 22 | 9 | Δ |
| 13 | 2.4 | 7 | 11 | X |
| 14 | 0.26 | 128 | 17 | X |

As is apparent from the results shown in Table 2, the sheets of the present invention (No. 8 to No. 12) had Ra, Pc and the difference in thickness within the prescribed ranges, and glass laminates obtained by using them had a good appearance with little remaining bubbles. Especially in No. 9 to No. 11 wherein Ra is within a range of from 0.1 to 0.5 µm, and the number of peaks Pc is within a range of from 50 to 200 peaks/8 mm, glass laminates were obtained wherein remaining bubbles were extremely little.

Whereas, in No. 13 and No. 14 wherein the emboss shape is outside the definition of the present invention, it was not possible to obtain a glass laminate having good appearance.

No. 15 to No. 25

No. 15

A copolymer fluorocarbon resin comprising 40 wt % of vinylidene fluoride, 40 wt % of tetrafluoroethylene and 20 wt % of hexafluoropropylene, was extruded at 180° C. by an extruder to obtain a fluorocarbon resin sheet having a thickness of 200 µm.

On each side of the fluorocarbon resin sheet, the same adhesive as used in No. 1 was directly coated as an adhesive and dried to form an adhesive layer having a thickness of 0.4 µm, and an emboss having the same shape as in No. 1 was formed on its surface.

With respect to the fluorocarbon resin sheet of the obtained sheet for lamination, the fluorine content, the total light transmittance Db and the refractive index Mb were measured, and the refractive index Na of the adhesive layer alone and the thickness Db of the adhesive layer were measured. Further, using the sheet for lamination, a glass laminate was prepared, and its transparency and bonding strength were evaluated.

No. 16

The same test as in No. 15 was carried out except that the thickness of the adhesive layer was changed to 0.1 µm.

No. 17

The same test as in No. 16 was carried out except that as the adhesive used, a solution of an acrylic resin comprising methyl methacrylate as the main component (Acrylic BZ-1161, tradename, manufactured by Dai Nippon Ink Kogyo K.K.) was used.

No. 18

The same test as in No. 15 was carried out except that the thickness of the adhesive layer was changed to 0.1 µm.

No. 19

The same test as in No. 15 was carried out except that the thickness of the adhesive layer was changed to 0.03 µm.

No. 20

On two sheets of glass, a silane coupling agent layer (γ-aminopropylethoxysilane) was formed as an adhesive layer in a thickness of 0.005 µm, and the same fluorocarbon resin sheet (without an adhesive layer) as used in No. 15 was sandwiched therebetween and laminated, and thereafter, the same test as in No. 15 was carried out.

No. 21

The same test as in No. 15 was carried out except that the thickness of the adhesive layer was changed to 6 µm.

No. 22

The same test as in No. 16 was carried out except that using the same adhesive as used in No. 17, an adhesive layer having a thickness of 2 µm was formed.

No. 23

The same test as in No. 15 was carried out except that as the adhesive used, a solution of a mixture comprising polyvinyl chloride and polymethyl methacrylate in the equal weight proportions, was used.

No. 24

The same test as in No. 15 was carried out except that thickness of the adhesive layer was changed to 12 µm.

No. 25

The same test as in No. 15 was carried out except that as the fluorocarbon resin sheet, a sheet of ethylene-tetrafluoroethylene copolymer was used.

The results of the foregoing are shown in Tables 3 and 4.

The tests and evaluation methods other than the above-described items are as follows.

Refractive Indices Nb and Na

These indices were measured by means of an Abbe refractometer using D ray of sodium as a light source.

The refractive index Nb of the fluorocarbon resin sheet was directly measured. Whereas, Na of the adhesive layer was measured in such a manner that the adhesive was coated on a separate sheet of a tetrafluoroethylene having a thickness of 100 µm and dried, and then the sheet was peeled off and subjected to the measurement in the form of a film of the adhesive alone.

Thickness Tb of the Adhesive Layer

The cross section of the sheet for lamination was observed by a scanning electron microscope, and the thickness of the adhesive layer was measured.

Transparency of the Glass Laminate

The sheet for lamination was sandwiched between a pair of soda lime glass plates (50 mm×150 mm) having a thickness of 3 mm and pressed at a temperature of 130° C. for 10 minutes under a pressure of 5 kg/cm² for lamination. The transparency of the obtained laminate was visually evaluated by the following four standards.

◎: Transparent

◯: Substantially transparent

Δ: Slightly fogged

X: Fogged

Bonding Strength of the Glass Laminate

Soda lime glass having a thickness of 3 mm (50 mm×150 mm)/a sheet for lamination/a film of polytetrafluoroethylene having a thickness of 100 µm, were laminated in this order and pressed at a temperature of 140° C. for 5 minutes under a pressure of 2 kg/cm², for lamination, whereupon the polytetrafluoroethylene film was peeled off to obtain a laminate of the glass/the sheet for lamination. Then, two notches were imparted to the sheet for lamination at a distance of 18 mm, and the sheet between the notches was peeled in parallel with the notched direction at an angle of 180° at a rate of 5 mm/min at 23° C., whereby the peel strength was obtained (normal state strength).

Further, after lamination, the laminate was immersed in boiling water of 100° C. for 2 hours and then taken out, and a peeling test was carried out under the same conditions. The strength thereby obtained was designated as boil strength. The unit is gf/18 mm.

TABLE 3

| | No. 15 | No. 16 | No. 17 | No. 18 | No. 19 | No. 20 |
|---|---|---|---|---|---|---|
| Fluorine content | 69 | 69 | 69 | 69 | 69 | 69 |
| Total light transmittance Tb (%) | 96 | 96 | 96 | 96 | 96 | 96 |
| Refractive index Nb | 1.37 | 1.37 | 1.37 | 1.37 | 1.37 | 1.37 |
| Refractive index Na of adhesive coating layer | 1.42 | 1.42 | 1.49 | 1.42 | 1.42 | 1.43 |
| Thickness Da of adhesive coating layer (µm) | 0.4 | 0.1 | 0.1 | 1.0 | 0.03 | 0.005 |
| |Na − Nb| | 0.05 | 0.05 | 0.12 | 0.05 | 0.05 | 0.06 |
| Da × |Na − Nb| | 0.2 | 0.005 | 0.012 | 0.05 | 0.002 | 0.0003 |
| Transparency | ◎ | ◎ | ◎ | ◯ | ◎ | ◎ |

TABLE 3-continued

|  | No. 15 | No. 16 | No. 17 | No. 18 | No. 19 | No. 20 |
|---|---|---|---|---|---|---|
| Boiling strength |  |  |  |  |  |  |
| Normal state | 1000 | 900 | 1300 | 1200 | 700 | 300 |
| Boil | 700 | 700 | 1100 | 900 | 200 | 100 |
| Overall evaluation | ⊚ | ⊚ | ⊚ | ○ | ○ | Δ |

TABLE 4

|  | No. 21 | No. 22 | No. 23 | No. 24 | No. 25 |
|---|---|---|---|---|---|
| Fluorine content | 69 | 69 | 69 | 69 | 59 |
| Total light transmittance Tb (%) | 96 | 96 | 96 | 96 | 87 |
| Refractive index Nb | 1.37 | 1.37 | 1.37 | 1.37 | 1.40 |
| Refractive index Na of adhesive coating layer | 1.42 | 1.49 | 1.52 | 1.42 | 1.42 |
| Thickness Da of adhesive coating layer ($\mu$m) | 6 | 2 | 0.4 | 12 | 0.4 |
| \|Na − Nb\| | 0.05 | 0.12 | 0.15 | 0.05 | 0.02 |
| Da × \|Na − Nb\| | 0.30 | 0.24 | 0.06 | 0.60 | 0.008 |
| Transparency | Δ | Δ | X | X | X |
| Boiling strength |  |  |  |  |  |
| Normal state | 1600 | 1700 | 0 | 1700 | 0 |
| Boil | 1100 | 1300 | — | 1100 | — |
| Overall evaluation | Δ | Δ | X | X | X |

As is evident from the results shown in Tables 3 and 4, with those within the scope of the present invention, the overall evaluation is at least Δ and superior. No. 15 to No. 17 are particularly excellent, as both their transparency and bonding strength were at high levels.

No. 26 to No. 36

No. 26

A copolymer fluorocarbon resin comprising 40 wt % of vinylidene fluoride, 20 wt % of tetrafluoroethylene and 40 wt % of tetrafluoroethylene, was extruded at 180° C. by an extruder to obtain a fluorocarbon resin sheet having a thickness of 200 $\mu$m.

As an adhesive, one prepared by blending a fluorocarbon resin comprising 61 wt % of vinylidene fluoride, 24 wt % of tetrafluoroethylene and 15 wt % of hexafluoropropylene, and an acrylic resin comprising 95 wt % of methyl methacrylate and 5 wt % of ethyl methacrylate, in a weight ratio of 70/30, was used, and this adhesive was dissolved in a solvent mixture comprising butyl acetate and methyl isobutyl ketone (weight ratio: 75/25). The solution thereby obtained was coated on the fluorocarbon resin sheet by a coater and heated in a heating furnace of 120° C. for 30 seconds to evaporate and remove the solvent, to form an adhesive layer having a thickness of 1 $\mu$m on one side of the fluorocarbon resin sheet.

Using the obtained fluorocarbon resin sheet of the sheet for lamination, the bonding strength and the transparency were evaluated. The results are shown in Table 5. The evaluation methods were the same as described for the tests of the above No. 15 to No. 25.

No. 27

The evaluation was carried out in the same manner as in No. 26 except that as the fluorocarbon resin sheet, a sheet of a copolymer fluorocarbon resin comprising 20 wt % of vinylidene fluoride, 60 wt % of tetrafluoroethylene and 20 wt % of hexafluoropropylene, was used.

No. 28

The evaluation was carried out in the same manner as in No. 26 except that as the adhesive, one prepared by blending a fluorocarbon resin consisting of 100 wt % of vinylidene fluoride and an acrylic resin consisting of 100 wt % of methyl methacrylate in a weight ratio of 55/45, was used.

No. 29

The evaluation was carried out in the same manner as in No. 26 except that a fluorocarbon resin sheet having no adhesive coating layer provided, was used.

No. 30

The evaluation was carried out in the same manner as in No. 26 except that as the adhesive agent, an acrylic copolymer comprising 95 wt % of methyl methacrylate and 5 wt % of ethyl methacrylate, was used, and the thickness of the adhesive layer was changed to 1.5 $\mu$m.

No. 31

The evaluation was carried out in the same manner as in No. 26 except that as the adhesive, a fluorocarbon resin comprising 61 wt % of vinylidene fluoride, 24 wt % of tetrafluoroethylene and 15 wt % of hexafluoropropylene, was used, and the thickness of the adhesive layer was changed to 1.5 $\mu$m.

No. 32

The evaluation was carried out in the same manner as in No. 26 except that as the adhesive, a tetrafluoroethylene-vinyl ester copolymer (Cefral coat A-402B, manufactured by Central Glass Co., Ltd.) was used, and the thickness of the adhesive layer was changed to 1.5 $\mu$m.

No. 33

The evaluation was carried out in the same manner as in No. 26 except that as the adhesive, a partially saponified ethylene vinyl acetate copolymer resin (Takemerto SD-181, manufactured by Takeda Chemical Industries, Ltd.) was used, and the thickness of the adhesive layer was changed to 2 $\mu$m.

No. 34

The evaluation was carried out in the same manner as in No. 26 except that as the adhesive, a polyvinyl butyral resin (manufactured by Sekisui Chemical Co., Ltd.) was used, and the thickness of the adhesive layer was changed to 2 $\mu$m.

No. 35

The evaluation was carried out in the same manner as in No. 26 except that as the adhesive, an epoxy type adhesive (Araldite AER 280, manufactured by Chiba Geigy AG) was used, and the thickness of the adhesive layer was changed to 5 pm.

No. 36

The evaluation was carried out in the same manner as in No. 26 except that as the adhesive, a silicone type adhesive (Bond MOS-7, manufactured by Konishi K.K.) was used, and the thickness of the adhesive layer was changed to 5 $\mu$m.

The results of these evaluations are shown in Table 5.

TABLE 5

|  |  | Bonding strength | | Trans-parency | Overall evaluation |
|---|---|---|---|---|---|
|  | Adhesive | Normal state | Boil |  |  |
| No. 26 | Fluorocarbon resin + acrylic resin | 1200 | 900 | ⊚ | ○ |
| No. 27 | Fluorocarbon resin + acrylic resin | 1000 | 700 | ⊚ | ○ |
| No. 28 | Fluorocarbon resin + acrylic resin | 1200 | 1000 | ⊚ | ○ |

TABLE 5-continued

| | | Bonding strength | | | |
|---|---|---|---|---|---|
| | Adhesive | Normal state | Boil | Trans- parency | Overall evaluation |
| No. 29 | Nil | 700 | 0 | ⊚ | X |
| No. 30 | Acrylic resin | 400 | 100 | X | X |
| No. 31 | Fluorocarbon resin | 200 | 0 | ⊚ | X |
| No. 32 | Fluorocarbon resin | 700 | 200 | ⊚ | Δ |
| No. 33 | Partially saponified EVA | 100 | 10 | X | X |
| No. 34 | Polyvinylbutyral | 0 | 0 | X | X |
| No. 35 | Epoxy | 1600 | 0 | X | X |
| No. 36 | Silicone | 1100 | 400 | X | X |

As is evident from the results shown in Table 5, in No. 26 to No. 28 wherein an adhesive comprising a fluorocarbon resin component and an acrylic resin component, was used, it was possible to obtain glass laminates which were excellent in the transparency and the bonding strength.

No. 37 to No. 41

No. 37

The same fluorocarbon resin sheet as used in No. 26, was used. As the adhesive, one prepared by blending a fluorocarbon resin comprising 61 wt % of vinylidene fluoride, 24 wt % of tetrafluoroethylene and 15 wt % of hexafluoropropylene, and γ-aminopropyltriethoxysilane, in a weight ratio of 95/5, was used. This adhesive was dissolved in 2-butanone and coated on the fluorocarbon resin sheet by a coater and heated in a heating furnace of 80° C. for 30 seconds to evaporate and remove the solvent, to form an adhesive layer having a thickness of 1 μm on one side of the fluorocarbon resin sheet.

Using the obtained fluorocarbon resin sheet of a sheet for lamination, the bonding strength and the transparency were evaluated. The results are shown in Table 6. The evaluation methods were the same as described in the above tests.

No. 38

The evaluation was carried out in the same manner as in No. 37 except that as the fluorocarbon resin for the fluorocarbon resin sheet and the adhesive, a copolymer fluorocarbon resin comprising 20 wt % of vinylidene fluoride, 60 wt % of tetrafluoroethylene and 20 wt % of hexafluoropropylene, was used.

No. 39

The evaluation was carried out in the same manner as in No. 37 except that as the adhesive, one prepared by blending a fluorocarbon resin comprising 40 wt % of vinylidene fluoride, 40 wt % of tetrafluoroethylene and 20 wt % of hexafluoropropylene, and γ-aminopropyltriethoxysilane, in a weight ratio of 99.5/0.5, was used.

No. 40

The evaluation was carried out in the same manner as in No. 37 except that as the adhesive, one prepared by blending a fluorocarbon resin comprising 40 wt % of vinylidene fluoride, 40 wt % of tetrafluoroethylene and 20 wt % of hexafluoropropylene, and γ-aminopropyltriethoxysilane, in a weight ratio of 85/15, was used.

With this adhesive, the adhesive solution underwent a viscosity increase toward the latter half of the coating time during coating of the adhesive layer, whereby the coating operation became impossible.

No. 41

The evaluation was carried out in the same manner as in No. 37 except that as the adhesive, one prepared by blending a fluorocarbon resin comprising 40 wt % of vinylidene fluoride, 40 wt % of tetrafluoroethylene and 20 wt % of hexafluoropropylene, and γ-glycidoxypropyltrimethoxysilane, in a weight ratio of 95/5, was used.

The results of these evaluations are shown in Table 6.

TABLE 6

| | | Bonding strength | | | |
|---|---|---|---|---|---|
| | Adhesive | Normal state | Boil | Trans- parency | Overall evaluation |
| No. 37 | Fluorocarbon resin + silane coupling agent (amino type) 95/5 | 1600 | 1500 | ⊚ | ○ |
| No. 38 | Fluorocarbon resin + silane coupling agent (amino type) 95/5 | 1100 | 1000 | ⊚ | ○ |
| No. 39 | Fluorocarbon resin + silane coupling agent (amino type) 99.5/0.5 | 1000 | 0 | ⊚ | X |
| No. 40 | Fluorocarbon resin + silane coupling agent (amino type) 85/15 | 1900 | 1900 | X | X |
| No. 41 | Fluorocarbon resin + silane coupling agent (epoxy type) 95/5 | 900 | 100 | ⊚ | X |

As is evident from the results shown in Table 6, in No. 37 and No. 38 wherein an adhesive containing a fluorocarbon resin and an amino type silane coupling agent within the prescribed ranges, was used, glass laminates excellent in the transparency and the bonding strength were obtained.

As used herein, the recited percentage of fluorine content of the fluorocarbon resin is in weight percent.

As described in the foregoing, the fluorocarbon resin sheet and the glass laminate of the present invention, are excellent in the lamination property of the sheet and the glass plates, and thus have a merit that the glass laminate thereby obtained is excellent in the transparency and the flame retardancy.

What is claimed is:

1. A fluorocarbon resin sheet having a fluorine content of at least 55 wt. % and a melting point of from 60 to 220° C., made solely of a polymer comprising at least one fluorine-containing monomer, or made of a blend of such a polymer with other polymer, which has a total light transmittance of at least 80% and a tensile modulus of elasticity within a range of from $1 \times 10^7$ to $4 \times 10^9$ Pa within an entire measuring temperature range of from 0 to 30° C., wherein the surface of the resin sheet is embossed to have a center line average roughness Ra of from 0.05 to 2.0 μm and a number of peaks Pc of from 5 to 500 peaks/8 mm.

2. The fluorocarbon resin sheet according to claim 1, wherein the surface of the fluorocarbon resin sheet is embossed to have a center line average roughness Ra of from 0.1 to 0.5 μm and a number of peaks Pc of from 50 to 200 peaks/8 mm, and the difference between the maximum value and the minimum value of thickness within a range of 5 cm of the sheet, is at most 15 μm.

3. The fluorocarbon resin sheet provided with an adhesive layer according to claim 1, wherein the surface of the adhesive layer is embossed to have a center line average roughness Ra of from 0.1 to 0.5 μm and a number of peaks Pc of from 50 to 200 peaks/8 mm, and the difference between the maximum value and the minimum value of thickness within optional 5 cm of the sheet, is at most 15 µm.

4. A fluorocarbon resin sheet provided with an adhesive layer, which comprises a fluorocarbon resin sheet having a fluorine content of at least 55 wt. % and a melting point of from 60 to 220° C., made solely of a polymer comprising at least one fluorine-containing monomer, or made of a blend of such a polymer with other polymer, which sheet has a total light transmittance of at least 80% and a tensile modulus of elasticity within a range of from $1 \times 10^7$ to $4 \times 10^9$ Pa within an entire measuring temperature range of from 0 to 30° C., and an adhesive layer formed on one side or each side of the fluorocarbon resin sheet, wherein the surface of the adhesive layer is embossed to have a center line average roughness Ra of from 0.05 to 2.0 µm and a number of peaks Pc of from 5 to 500 peaks/8 mm.

5. The fluorocarbon resin sheet provided with an adhesive layer according to claim 4, wherein the adhesive layer is made of an adhesive coating comprising from 40 to 80 wt. % of a fluorocarbon resin component and from 20 to 60 wt. % of an acrylic resin component, wherein said acrylic resin component is at least 90 wt. % of methyl methacrylate.

6. The fluorocarbon resin sheet provided with an adhesive layer according to claim 5, wherein the fluorocarbon resin component comprises from 50 to 100 wt. % of vinylidene fluoride, from 0 to 40 wt. % of tetrafluoroethylene, and from 0 to 30 wt. % of hexafluoropropylene.

7. The fluorocarbon resin sheet provided with an adhesive layer according to claim 5, wherein the fluorocarbon resin component has a number average molecular weight (Mn) of about 40,000 to 150,000.

8. The fluorocarbon resin provided with an adhesive layer according to claim 5, wherein the acrylic acid component has a number average molecular weight (Mn) of 2,000 to 50,000.

9. The fluorocarbon resin sheet provided with an adhesive layer according to claim 4, wherein the adhesive layer is made of an adhesive coating comprising from 90 to 99 wt % of a fluorocarbon resin component and from 1 to 10 wt % of an amino silane coupling agent.

10. A fluorocarbon resin sheet provided with an adhesive layer, which comprises a fluorocarbon resin sheet having a fluorine content of at least 55 wt. % and a melting point of from 60 to 220° C., made solely of a polymer comprising at least one fluorine-containing monomer, or made of a blend of such a polymer with other polymer, which sheet has a tensile modulus of elasticity within a range of from $1 \times 10^7$ to $4 \times 10^9$ Pa within an entire measuring temperature range of from 0 to 30° C., and an adhesive layer formed on one side or each side of the fluorocarbon resin sheet, wherein the total light transmittance Tb of the fluorocarbon resin sheet is at least 90%, the thickness Da of the adhesive layer is from 0.03 to 10 µm, and the absolute value of Na–Nb, i.e. |Na–Nb|, is at most 0.13, where Na is the refractive index of the adhesive layer, and Nb is the refractive index of the fluorocarbon resin sheet.

11. The fluorocarbon resin sheet provided with an adhesive layer according to claim 10, wherein Da is within a range of from 0.05 to 0.5, and Da×|Na–Nb|≦0.03.

12. A glass laminate comprising at least two glass plates and a fluorocarbon resin sheet interposed between the glass plates, said resin sheet being a fluorocarbon resin sheet having a fluorine content of at least 55 wt. % and a melting point of from 60 to 220° C., made solely of a polymer comprising at least one fluorine-containing monomer, or made of a blend of such a polymer with other polymer, which has a total light transmittance of at least 80% and a tensile modulus of elasticity within a range of from $1 \times 10^7$ to $4 \times 10^9$ Pa within an entire measuring temperature range of from 0 to 30° C., wherein the surface of the resin sheet is embossed to have a center line average roughness Ra of from 0.05 to 2.0 µm and a number of peaks Pc of from 5 to 500 peaks/8 mm.

13. A glass laminate comprising a glass plate and a fluorocarbon resin sheet which are laminated by an adhesive layer, said resin sheet being a fluorocarbon resin sheet having a fluorine content of at least 55 wt. % and a melting point of from 60 to 220° C., made solely of a polymer comprising at least one fluorine-containing monomer, or made of a blend of such a polymer with other polymer, which sheet has a tensile modulus of elasticity within a range of from $1 \times 10^7$ to $4 \times 10^9$ Pa within an entire measuring temperature range of from 0 to 30° C., wherein the total light transmittance Tb of the fluorocarbon resin sheet is at least 90%, the thickness Da of the adhesive layer is from 0.03 to 10 µm, and the absolute value of Na–Nb, i.e. |Na–Nb|, is at most 0.13, where Na is the refractive index of the adhesive layer, and Nb is the refractive index of the fluorocarbon resin sheet.

14. The glass laminate according to claim 13, wherein the glass plate and the fluorocarbon resin sheet are laminated by an adhesive layer comprising from 40 to 80 wt. % of a fluorocarbon resin component and from 20 to 60 wt. % of an acrylic resin component, wherein said acrylic resin component comprises at least 90 wt. % of methyl methacrylate.

15. The glass laminate according to claim 14, wherein the fluorocarbon resin component comprises from 50 to 100 wt. % of vinylidene fluoride, from 0 to 40 wt. % of tetrafluoroethylene, and from 0 to 30 wt. % of hexafluoropropylene.

16. The glass laminate according to claim 14, wherein the acrylic resin component has a number average molecular weight (Mn) of about 40,000 to 150,000.

17. The glass laminate according to claim 14, wherein the acrylic acid component has a number average molecular weight of about 2,000 to 50,000.

18. The glass laminate according to claim 13, wherein the glass plate and the fluorocarbon resin sheet are laminated by an adhesive layer comprising from 90 to 99 wt % of a fluorocarbon resin component and from 1 to 10 wt % of an amino silane coupling agent.

19. The glass laminate according to claim 13, wherein said adhesive layer further comprises an acid monomer selected from the group consisting of acrylic acid, methacrylic acid, fumaric acid and itacenic acid, thereby improving adhesion of said fluorocarbon resin sheet to said glass plate.

20. A fluorocarbon resin sheet provided with an adhesive layer, which comprises a fluorocarbon resin sheet having a fluorine content of at least 55% and a melting point of from 60 to 200° C., made solely of a polymer comprising at least one fluorine-containing monomer, or made of a blend of such a polymer with another polymer, which sheet has a tensile modulus of elasticity within a range of from $1 \times 10^7$ to $4 \times 10^9$ Pa within an entire measuring temperature range of from 0 to 30° C., and an adhesive layer formed on one side or each side of the fluorocarbon resin sheet, wherein the total light transmittance Tb of the fluorocarbon resin sheet is at least 90%, the thickness Da of the adhesive layer is at least 0.01 µm, and Da×|Na–Nb| is ≦to 0.1, where Na is the refractive index of the adhesive layer, and Nb is the refractive index of the fluorocarbon resin sheet.

* * * * *